US010321375B2

(12) United States Patent
Mirra et al.

(10) Patent No.: US 10,321,375 B2
(45) Date of Patent: Jun. 11, 2019

(54) DELAYED SATELLITE HANDOVER

(71) Applicant: Hughes Network Systems, LLC, Germantown, MD (US)

(72) Inventors: Steven Dominic Mirra, Gaithersburg, MD (US); Ramanathan Venkat Thirunallaih, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 163 days.

(21) Appl. No.: 15/395,085

(22) Filed: Dec. 30, 2016

(65) Prior Publication Data

US 2018/0192339 A1     Jul. 5, 2018

(51) Int. Cl.
*H04W 36/10* (2009.01)
*H04W 40/12* (2009.01)
*H04W 28/08* (2009.01)
*H04W 36/08* (2009.01)
*H04B 7/185* (2006.01)
*H04W 36/06* (2009.01)
*H04W 36/16* (2009.01)
(Continued)

(52) U.S. Cl.
CPC ........ *H04W 36/10* (2013.01); *H04B 7/18513* (2013.01); *H04B 7/18541* (2013.01); *H04W 28/085* (2013.01); *H04W 36/0027* (2013.01); *H04W 36/0079* (2018.08); *H04W 36/06* (2013.01); *H04W 36/08* (2013.01); *H04W 36/165* (2013.01); *H04W 36/38* (2013.01); *H04W 40/04* (2013.01); *H04W 40/12* (2013.01); *H04W 36/28* (2013.01); *H04W 84/06* (2013.01)

(58) Field of Classification Search
CPC ............ H04B 7/18541; H04B 7/18513; H04B 7/18517; H04B 7/18519; H04B 7/1853; H04W 36/0005; H04W 36/0027; H04W 36/0055; H04W 36/0058; H04W 36/0079; H04W 36/06; H04W 36/08; H04W 36/10; H04W 36/165–36/22; H04W 36/30; H04W 36/38; H04W 40/04; H04W 40/12; H04W 28/085
See application file for complete search history.

(56) References Cited

U.S. PATENT DOCUMENTS

2011/0250886 A1* 10/2011 Park .................... H04B 7/2606
455/436
2012/0176891 A1* 7/2012 Chin ................. H04W 36/0055
370/221
(Continued)

OTHER PUBLICATIONS

Khan et al., "Cellular Handover Approaches in 2.5G to 5G Technology," International Journal of Computer Applications (0975-8887), vol. 21—No.2, May 2011, pp. 28-37.

*Primary Examiner* — Joshua Kading
(74) *Attorney, Agent, or Firm* — Bejin Bieneman PLC

(57) ABSTRACT

A first computer that includes a processor and memory storing instructions executable by the processor—the processor is programmed to: establish a satellite link between a satellite terminal and the first computer, the link comprising at least one radio access bearer (RAB); receive a rejection message from a second computer indicating that the second computer refuses to accept a terminal handover; and in response to receiving the rejection message, transmit to the second computer a pending handover request message comprising an indication of a link quality of the at least one RAB.

19 Claims, 7 Drawing Sheets

(51) Int. Cl.
*H04W 36/00* (2009.01)
*H04W 36/38* (2009.01)
*H04W 40/04* (2009.01)
*H04W 84/06* (2009.01)
*H04W 36/28* (2009.01)

(56) References Cited

U.S. PATENT DOCUMENTS

2015/0271730 A1\* 9/2015 Benammar ........... H04W 36/30
 455/436
2016/0323032 A1\* 11/2016 Ulupinar ............ H04B 7/18541
2017/0188280 A1\* 6/2017 Watfa ................ H04W 36/0055

\* cited by examiner 500 (cont.)

DELAYED SATELLITE HANDOVER

BACKGROUND

Movement of a mobile satellite terminal currently engaged in a satellite link (e.g., having one or more radio access bearer (RAB) connections) sometimes results in a disconnection of one or more of the RABs. For example, this may occur as a result of a failed satellite terminal handover procedure (and the RABs not being handed over) when the terminal moved from a source satellite beam to a target satellite beam. One reason for such a disconnection is that a target controller (associated with the target satellite beam) currently is unable to accept additional RABs (e.g., due to available bandwidth, current throughput, etc.).

DETAILED DESCRIPTION

Figure 1:
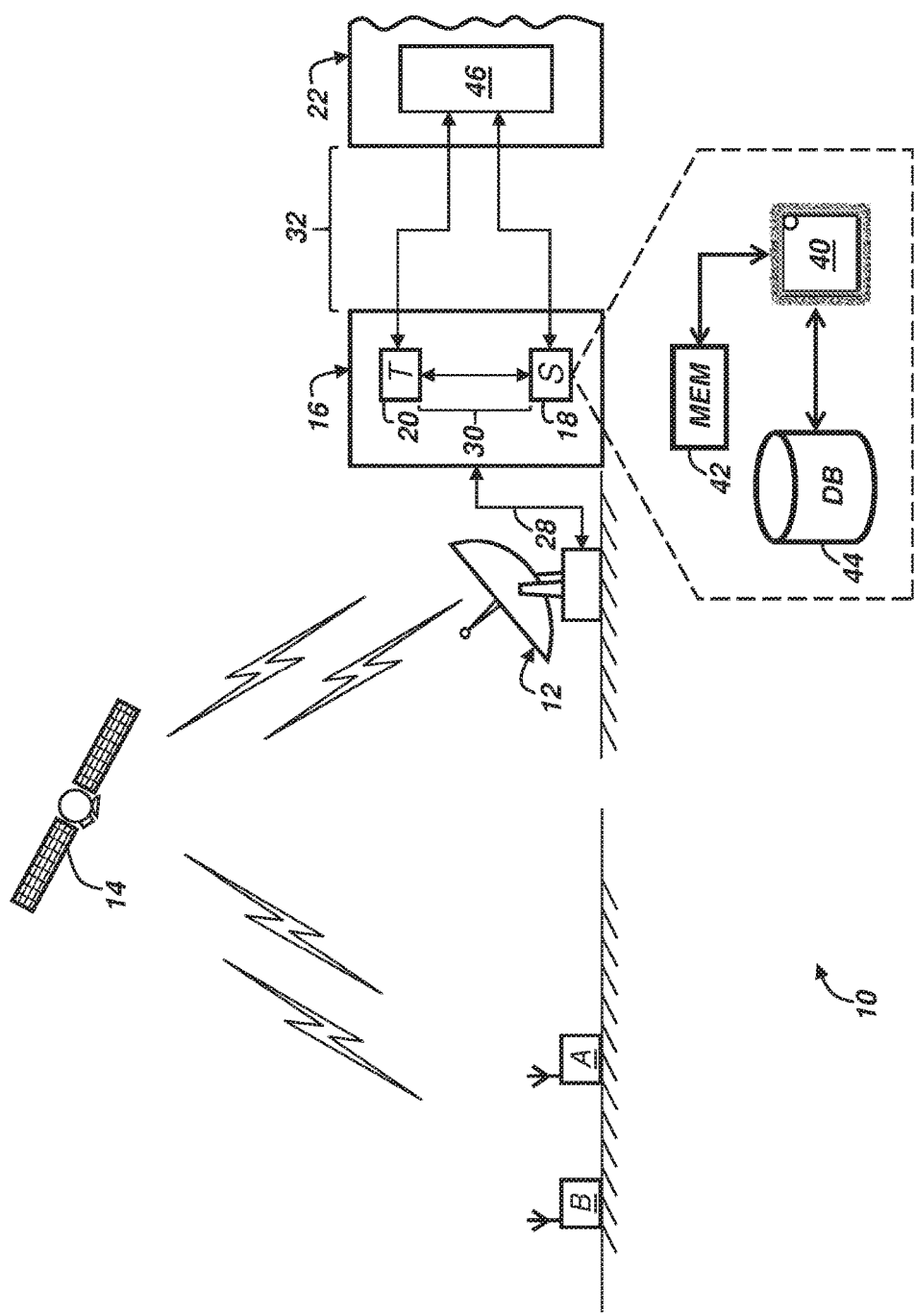
FIG. 1 illustrates an example of a satellite communication system.
Figure 2:
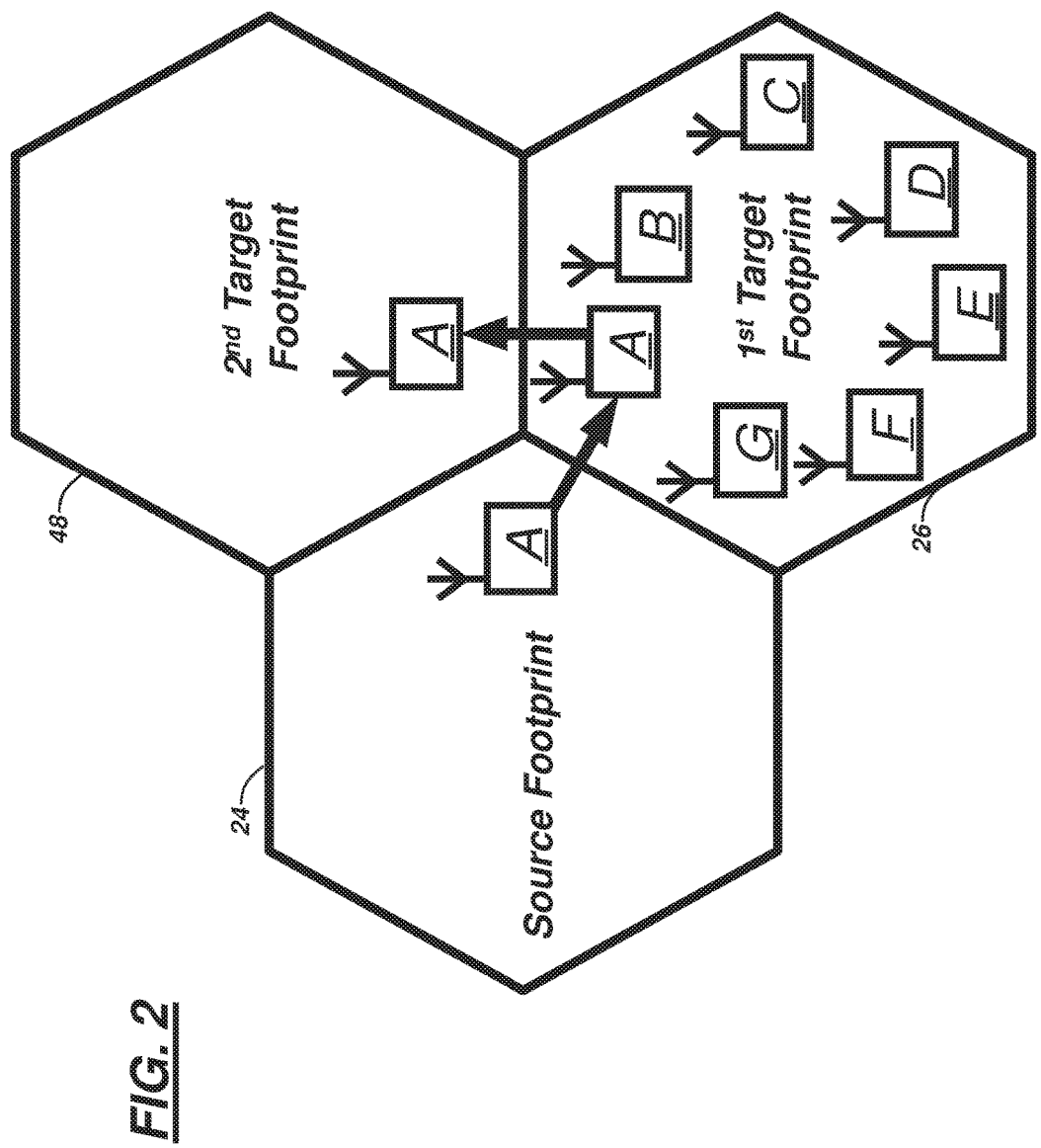
FIG. 2 illustrates several exemplary satellite beam footprints and a plurality of satellite terminals within the footprints.

With reference to the figures, wherein like numerals indicate like parts throughout the several views, a satellite communication system 10 is described that improves the connectivity of satellite terminals. As shown in FIG. 1, the system includes any suitable quantity of satellite terminals A-B (FIG. 2 showing terminals A-G) in communication with a radio frequency (RF) transceiver equipment 12 via one or more satellites 14. The system 10 further comprises—coupled to the RF transceiver equipment—a satellite base station 16 that includes multiple radio network controllers-satellite (or Radio Network Controllers for Satellite) (RNCSs) or computers 18, 20 and a telecommunications core network (CN) 22. As discussed in greater detail below, the satellite terminals send and/or receive data via a link (e.g., a communication connection—e.g., via a radio frequency carrier wave) using a radio access bearer (RAB) connection (or simply, a RAB), and at any given time, each satellite link may have zero, one, or multiple RABs. Communication via a RAB is facilitated by a respective RNCS (e.g., a source RNCS which communicates with a terminal (such as terminal A) via a satellite and its satellite beam (a so-called source satellite beam). A footprint 24 of the source beam (FIG. 2) may cover a predetermined region of the earth's surface, and when terminal A changes its location to another geographic region serviced by a different satellite beam (e.g., within footprint 26), the source RNCS may communicate with a target RNCS (associated with the corresponding beam). In this manner, a terminal handover procedure (of RABs) may be carried out wherein the RAB(s) previously serviced by the source RNCS (and source beam) can be transferred to the target RNCS (and corresponding target satellite beam). However, in such position-based handover procedures, scenarios exist where the target RNCS is unable to receive the RAB(s) being serviced by the source RNCS; consequently, the RAB(s) can be dropped or lost requiring terminal A to attempt re-connection with a suitable RNCS (and corresponding satellite beam). Dropped RAB(s) typically result in user frustration as the services being provided via the RAB(s)—e.g., voice data, packet data, streaming data, etc.—are at least temporarily discontinued. The satellite communication system 10 described herein minimizes such instances of dropped RABs by strategically delaying the handover procedure when a quality of the link is greater than a threshold, as discussed more below.

Terminals A-G may be any suitable end-user equipment capable of satellite communication. For example, while not illustrated, the terminals each may have a communication circuit or satellite chipset enabling wireless communication in a satellite beam (e.g., transmitted from one of the satellites). Non-limiting examples of satellite terminals include a global positioning system (GPS) device, a satellite telephone, a portable computer, a mobile satellite receiver (e.g., for receiving infotainment and/or entertainment services in a vehicle such as a land vehicle (e.g., automobile, truck, military vehicle, etc.), a marine vehicle, an aircraft, and the like. One non-limiting commercial implementation includes the vehicular terminal type (e.g., terminal type 67) in the MexSat system deployed by Hughes in Mexico, as identified in ETSI TS 101 376-5-2 V3.4.1 (2015-10) [refer to attached ETSI spec to see terminal type 67, identified with binary value 1000011, in Table C.1]; other commercial examples also exist.

The RF transceiver equipment 12 may include a satellite dish and communication electronics coupled to the satellite base station 16. The transceiver equipment may transmit data to and receive data from a constellation of satellites 14. Any suitable frequencies may be used; e.g., a so-called feeder link between the transceiver equipment and the satellite may use the Ku-band. Further, transceiver equipment 12 communicates with the satellite base station 16 (and its RNCSs 18, 20) via any suitable connection(s) 28 (e.g., one or more discrete connections and/or one or more data bus connections).

The one or more satellites 14 (only one is shown for purposes of illustration) may be any suitable satellite communication equipment located in earth's orbit—non-limiting examples include: observation satellites, communications satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans. Satellite(s) 14 may communicate with the terminals A-G via a so-called service link via any suitable frequency; e.g., one non-limiting service link frequency includes the L-band.

Satellite base station 16 includes the radio network controllers-satellite (or Radio Network Controller for Satellite) (RNCSs) 18, 20 and one or more communication gateway devices (not shown) (e.g., for connecting to the core network and other devices—e.g., SGSN/GGSN gateways, PDSN gateways, Intelligent Media Gateways (IMG), just to name a few examples). In FIG. 1, two illustrative RNCSs 18, 20 are shown—a target RNCS (labeled T) and a source RNCS (labeled S); however, it should be appreciated that more than two RNCSs may reside at a single base station. Further, multiple base stations may exist as well, each having multiple RNCSs. Within the satellite base station 16, the RNCSs

18, 20 may communicate with one another via a wired (and/or wireless) radio network controller interface (Iur interface) 30 (which may comprise one or more discrete connections and/or one or more data bus connections), and the RNCSs 18, 20 may communicate with the core network (CN) via a wired (and/or wireless) core network interface (Iu interface) 32. As used herein, the Iu interface 32 pertains to communications between the satellite base station 16 and the core network 22; and as used herein, the Iur interface 30 pertains to communications which are not routed through the core network 22, but are intra-satellite base station communications.

The hardware and software of each RNCS 18, 20 may be identical; therefore, only one RNCS (18) will be described. With respect to software, the programming instructions of RNCS 18 may cause RNCS 18 to operate as a source RNCS in one scenario and as a target RNCS in another scenario. Thus, the labels "T" and "S" are situational and for illustrative purposes only. In addition, it should be appreciated that the RNCS 18 could be configured to operate concurrently as a source RNCS and a target RNCS in some situations which pertain to the movement of multiple terminals.

As shown in FIG. 1, RNCS 18 includes one or more processors or processing circuits 40 (only one is shown for illustration purposes), and the processor 40 is coupled to memory 42. For example, processor 40 can be any type of device capable of processing electronic instructions, non-limiting examples including a microprocessor, a microcontroller or controller, an application specific integrated circuit (ASIC), etc.—just to name a few. Processor 40 may be dedicated to RNCS 18, or it may be shared with other RNCSs (e.g., 20). As will be apparent from the description which follows, RNCS 18 may be programmed to carry out at least a portion of the process described herein. For example, among other things, processor 40 can be programmed to execute digitally-stored instructions which may be stored in memory 42 and which enable the RNCS 18 (when operating as a source), during a terminal handover procedure of the RABs, to provide quality data associated within one or more of the RABs to RNCS 20. Similarly, among other things, processor 40 can be configured to execute digitally-stored instructions which may be stored in memory 42 and which enable the RNCS (when operating as a target) to prioritize handover requests from source RNCSs based at least partially on RAB quality data in order to minimize the quantity of dropped RABs during such handover procedures; in some instances, the RNCS (when acting as a target RNCS) may delay terminal handover based on a relatively higher link quality associated with the RABs of one or more terminal handover requests. These instructions will be described in greater detail below.

Memory 42 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read. As discussed above, memory 42 may store one or more computer program products which may be embodied as software, firmware, or the like.

In at least one example, memory 42 stores instructions executable by processor 40 to carry out blocks of the processes described below. For example, computer executable instructions may be compiled or interpreted from computer programs created using a variety of programming languages and/or technologies, including, without limitation, and either alone or in combination, Java™, C, C++, Visual Basic, Java Script, Perl, HTML, etc. Memory 42 also may store data in the form of files. A file in the computing device is generally a collection of data stored on a computer readable medium, such as a storage medium, a random access memory, etc.

RNCS 18 further may include one or more databases 44 to store, among other things, satellite communication data in a filing system. For example, database 44 may store or buffer: information being provided via the satellite links to the various terminals, footprint data including geographical data defining footprint boundaries, maintenance and software uploads for the RNCSs, etc. The database(s) 44 may be coupled directly or indirectly to the core network 22 (and thus to other remotely located servers (not shown)).

The core network 22 includes any suitable elements in a conventional telecommunications network—including but not limited to an illustrated Serving General Packet Radio Services (GPRS) Support Node (SGSN) 46. For example, 3G networks further may include additional SGSNs, Gateway GPRS Support Nodes (GGSNs), Home Location Registers (HLRs), Authentication Centers (AuCs), and the like. The core network further may include any suitable components of 1G, 2G, 4G, etc. networks and interface components therebetween as well—all of which are known to skilled artisans.

Turning again to FIG. 2, here three illustrative satellite footprints 24, 26, 48 are shown each associated with a respective satellite beam (not shown) that utilizes one or more radio frequency (RF) carrier waves (not shown). Satellite footprints outline geographic regions of the earth upon which the respective beams are aimed for use by satellite terminals (e.g., such as A-G). Thus, in position-based satellite communication systems, a terminal generally utilizes carrier wave(s) within a respective beam—where the signal is generally strongest; however, this of course is not required (e.g., as described more below, a terminal may be located within a footprint of one beam, while being connected to a carrier wave of another beam). For illustration sake, footprint 24 is illustrated as a source footprint (associated with source RNCS 18), footprint 26 is illustrated as a first target footprint (associated with target RNCS 20), and footprint 48 is shown as a second target footprint (associated with yet another RNCS not shown). Terminal A is shown moving between footprints 24, 26, 48. Conventionally, existing RABs of terminal A are transferred in a terminal handover procedure when terminal A moves from footprint 24 to footprint 26. However, if e.g., target RNCS 20 is unable to accept these RABs, the RABs may be dropped or lost—resulting in terminal user frustration. In the flow diagrams (FIGS. 3-4) which follow, these exemplary satellite footprints are referenced to illustrate at least a portion of the processes (FIGS. 5-7) described herein.

Figure 3:
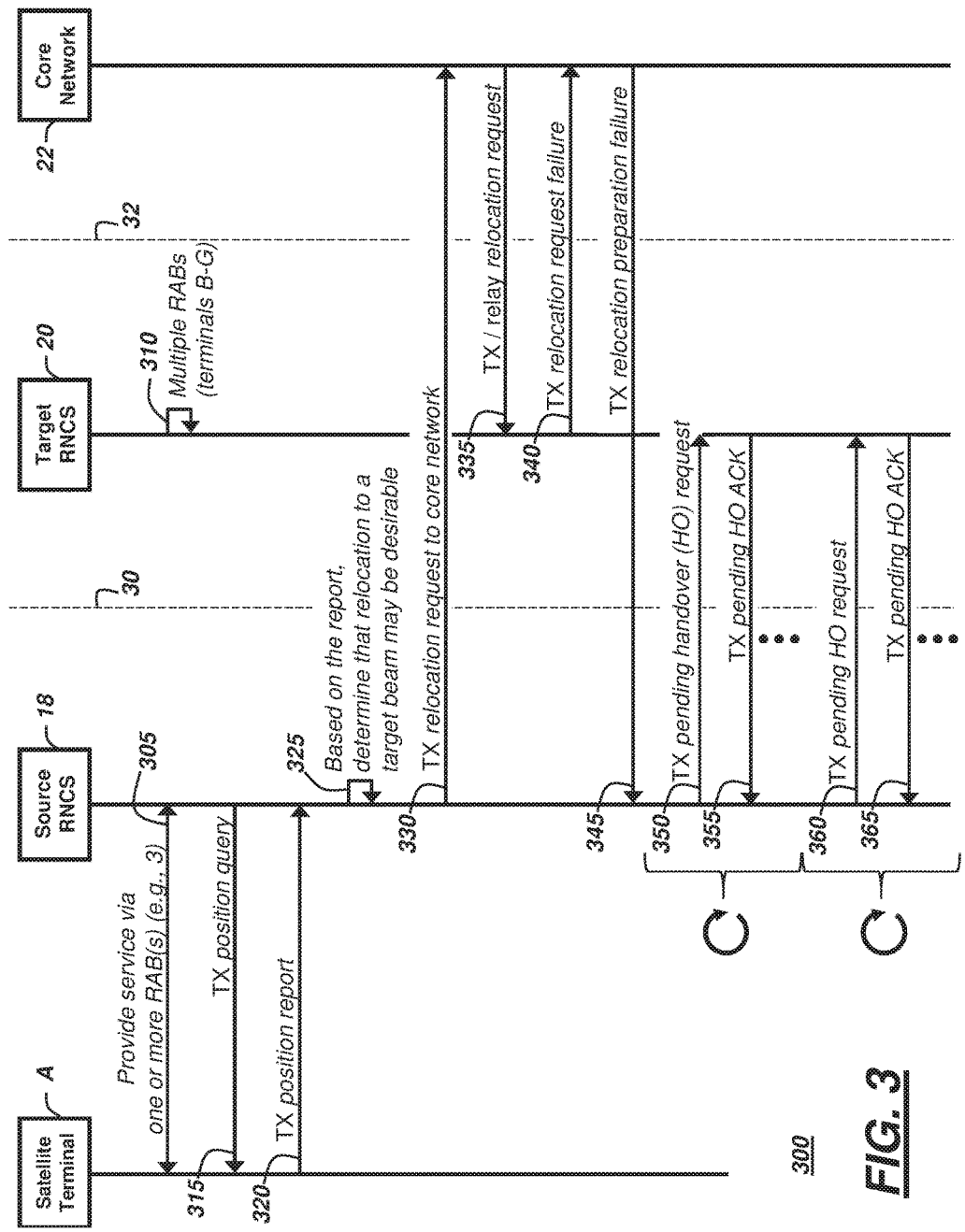
FIGS. 3-4 are flow diagrams of a sequence of events associated with a terminal handover procedure.
Figure 4:
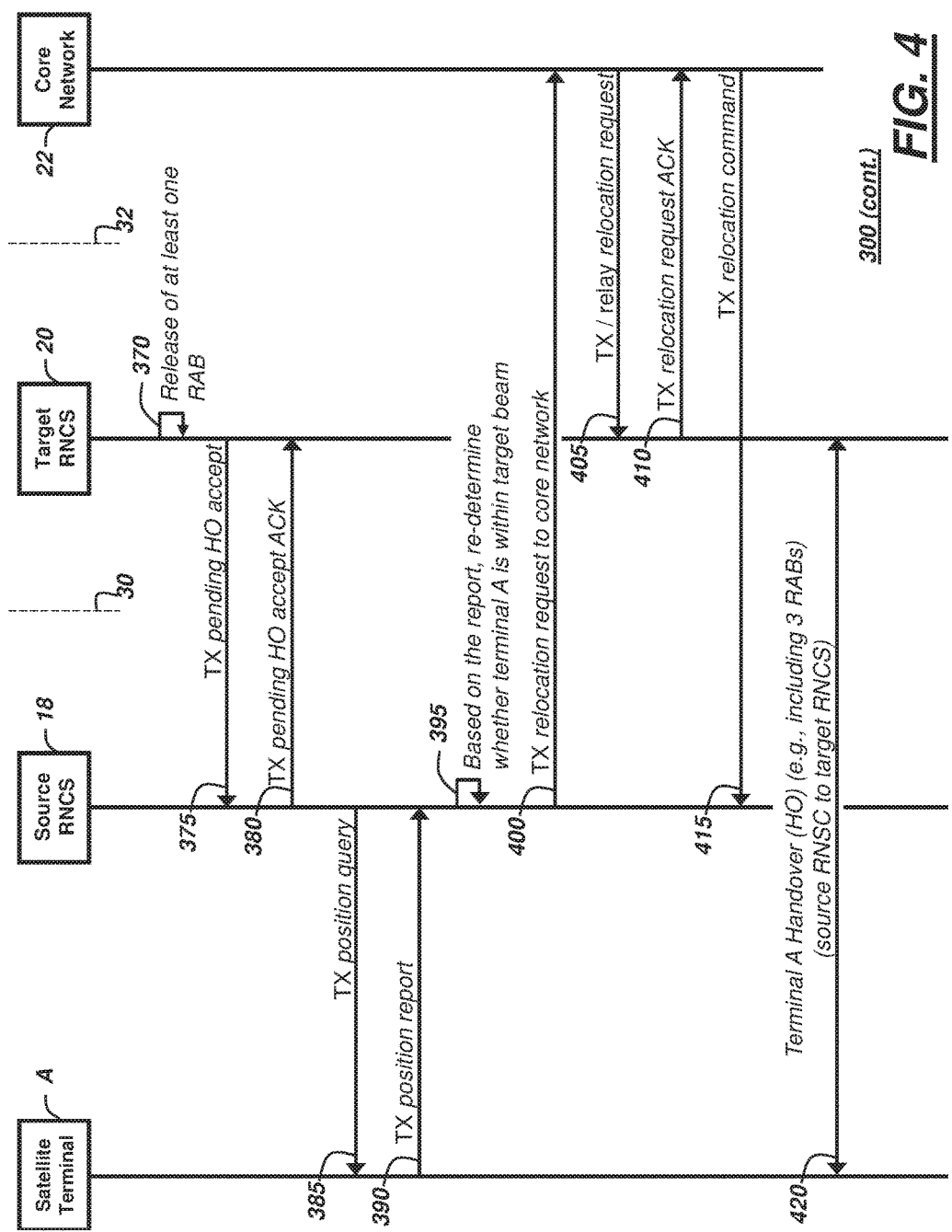

FIGS. 3-4 show a non-limiting sequence 300 of events or steps which may occur when a terminal handover procedure is attempted between the source RNCS 18 and target RNCS 20. The sequence can begin with step 305 (S305) and the source RNCS 18 establishing a satellite link with terminal A. For example, satellite communication services can be provided to the terminal A (hosted by the source RNCS 18 via a satellite link using one or more RABs). In this example, the link includes three RABs (of course, more or fewer RABs may be utilized in other examples).

Concurrently, in step 310, target RNCS 20 may host a number of links between it and terminals B-G—e.g., providing communication services similarly thereto—satellite links with each of these terminals being previously established as well. Each of these links may have one or more RABs as well.

In step 315, source RNCS 18 may transmit a position query to terminal A requesting location data and/or time data from the terminal A. Source RNCS 18 may send such queries periodically or in response to movement of the respective terminal (e.g., A). In response (S320), terminal A may provide a corresponding position report to source RNCS 18 that includes the position data (and in some instances also may include time data). Both the query and report may be sent via the satellite link (via satellite 14). In at least some instances, terminal A transmits a position report—without a prompt or query—e.g., after it has moved a predetermined distance relative to the location data of its last report (e.g., more than 10 miles).

Based on the report, source RNCS 18 may determine that relocation to a different satellite beam is desirable (S325). For example, if terminal A has moved outside of footprint 24, the source RNCS 18 may look up in database 44 which RNCS is associated with the beam over the present geographic location of the terminal A. Thus, in this illustrative implementation, when source RNCS 18 determines that terminal A now is within footprint 26 (the first target footprint), then a terminal handover procedure to target RNCS 20 may be desirable.

Next (S330), source RNCS 18 may transmit a relocation request message to the core network 22 (via interface Iu 32) indicating that—based on a position determination—terminal A (with its corresponding RABs) should be handed over from RNCS 18 to target RNCS 20. This message may be received by the SGSN 46 (at core network 22) which may be configured to communicate this to the appropriate RNCS (e.g., RNCS 20). Thus, SGSN 46 then may transmit (or relay) this message (via interface Iu 32) to the target RNCS 20 (S335).

In at least some examples, the relocation request message includes an indication of the link quality associated with one or more of the RABs used by terminal A. For example, the indication of link quality could be provided using the Radio Resource Control (RRC) Container field (e.g., see 3GPP TS 25.413, v7.10.0 titled $3^{rd}$ Generation Partnership Project; Technical Specification Group Radio Access Network; UTRAN Iu Interface RANAP signaling (release 7), the entirety of which is incorporated by reference). In at least one example, a link quality is provided in the message for each existing RAB. In this manner, when the message is received by the target RNCS 20, the target RNCS may determine how best to prioritize the handover of the terminals (and their associated RABs) in light of currently serviced RABs by target RNCS 20 (e.g., terminals B-G), as well as the RABs of other relocation requests (e.g., of other terminals (not shown). This prioritization will be described in greater detail below.

One non-limiting example of an indication of link quality includes a scaled metric for each RAB (e.g., where 01 represents good link quality, 02 represents slightly degraded link quality, 03 represents substantially degraded link quality, etc.). As will be discussed more below, a good link quality (01) may indicate (e.g., to the target RNCS 20) that the terminal handover procedure may be delayed without affecting terminal A's quality of service (even though the terminal is outside of the footprint 24); a slightly degraded link quality (02) may indicate that the link quality is substandard and that the handover procedure may need to occur relatively soon as the link may soon become unviable for satellite communication; and a substantially degraded link quality (03) may indicate that the link quality is generally poor and that terminal handover may need to occur most urgently—e.g., the specific RAB may no longer be providing content to/from terminal A (e.g., content is fading in and out, or is entirely absent).

Another non-limiting example of an indication of link quality includes providing link quality margin (LQM) data in the relocation request message. As used herein, a link quality margin is a numerical difference between an actual link quality (e.g., a signal-to-noise ratio) and a minimum threshold link quality needed to convey data via the RAB. The minimum threshold link quality may be associated with a maximum quantity of errors carried by the link and thus may be associated with receiving uninterrupted service at the receiving terminal, receiving resolvable image data at the terminal, and the like. As described below, the source RNCS 18 may determine a scaled metric based on calculating a LQM (and provide the metric in the relocation request message (S330)). Or the relocation request message may contain at least some LQM data enabling the target RNCS 20 to determine for itself the link quality margin for a particular RAB; and thereafter, the target RNCS 20 may compare the link quality of terminal A with the link quality of other terminals seeking to relocate to target RNCS 20. One non-limiting example of a LQM calculation is shown in Equation (1) below—and, in accordance with the discussion above, this equation may be used by the source RNCS 18 or the target RNCS 20.

$$LQM=EsNo(\text{current})-EsNo(\text{CurrentStdDev})-EsNo(\text{min}),\qquad\text{Equation (1)}$$

wherein: EsNo(current) refers to an energy-to-noise ratio at the time of measurement, wherein the energy includes both signal and noise; EsNo(CurrentStdDev) refers to the standard deviation of EsNo(current); and EsNo(min) may refer a minimum signal energy (e.g., minimum EsNo value) of a satellite beam that is capable of providing a threshold frame error rate (FER) (e.g., FER<0.5%) for maintaining a particular RAB via a corresponding satellite link. EsNo (min) may vary depending on the nature or characteristic of the particular RAB. For example, a lowest modulation and coding scheme (MCS) may be used when a RAB is classified as 'background' or 'interactive.' Or if the highest MCS may be used when a RAB is classified as 'streaming data' having a predetermined guaranteed bit rate (GBR). Other MCS between the highest and lowest MCSs may be used for other RAB classifications. And of course, these are merely examples.

Thus, the scaled metrics above may be associated with thresholds which distinguish metric 01 from metric 02 (and metric 02 from metric 03). Example thresholds of '3' and '0' shown in Table (1); of course, other suitable thresholds may be used instead to characterize whether the link quality is a 01, 02, or 03. Further, in other examples, the metrics could be pass or fail, or could include four or more metrics, rather than three.

TABLE (1)

| Scale | LQM calculation |
|---|---|
| 01 | LQM >3 |
| 02 | 0 <= LQM <= 3 |
| 03 | LQM <0 |

Thus to illustrate, consider the following non-limiting examples using Equation (1) and Table (1) for a particular RAB (e.g., associated with source RNCS 18 and terminal A). If EsNo(min)=5 dB, the EsNo(current)=8.5 dB, and the EsNo(CurrentStdDev)=0 dB, then LQM=8.5−0−5=3.5, and the link quality would be 01 or a good link quality. Or if EsNo(min)=5 dB, the EsNo(current)=6 dB, and the EsNo (CurrentStdDev)=0 dB, then LQM=6−0−5=1, and the link quality would be 02 or a slightly degraded link quality. Or if EsNo(min)=5 dB, the EsNo(current)=5 dB, and the EsNo (CurrentStdDev)=1 dB, then LQM=5−1−5=−1, and the link quality would be 03 or a substantially degraded link quality (e.g., failing).

Thus, having received the relocation request message (S335) with an indication of link quality, the target RNCS 20 may determine whether to accept the three RABs. In making this determination, target RNCS 20 may consider and compare (with respect to the particular target beam), among other things, its available bandwidth and its current throughput (e.g., to service RABs associated with terminals B-G). In this example, throughput (or an amount of wireless traffic) may nearly equal bandwidth; thus, the target RNCS 20 may determine it is unable to accommodate any of the three additional RABs currently serviced by the source RNCS 18. Consequently, target RNCS 20 may transmit to the core network 22 a relocation request failure message (again via interface Iu 32) (S340)—e.g., a message rejecting the handover request. And in response, the core network 22 may transmit to the source RNCS 18 a relocation preparation failure message (via the Iu interface 30) (S345)—e.g., a message indicating the rejection.

In conventional systems, and based on terminal A's position, the source RNCS 18 may attempt to terminal handover to the target RNCS 20—e.g., in spite of the failure message. In some instances, one or more of the RABs may be handed-over; however, in many instances, unless something has changed at the target RNCS 20 (e.g., moments after it transmitted the failure message (S340)), the RABs are lost or dropped in a failed terminal handover procedure because the unavailable bandwidth/high throughput at the target RNCS 20.

However, according to the programming of the RNCSs 18, 20 in the present system 10, the terminal handover procedure may be delayed. For example, in response to re-receiving the relocation request failure message (S345), the source RNCS 18 instead may transmit a pending handover (HO) request message to the target RNCS 20 (S350). This message may indicate that the source RNCS 18 is awaiting to handover the terminal (and its corresponding RABs). In addition, this message may comprise indications of the link quality (e.g., of each of the three RABs). For example, in this instance (S350), the link quality of the RABs may each be good link quality (01). In response, target RNCS 20 may transmit a pending HO acknowledgment (ACK) message (S355)—e.g., indicating that the RNCS 20 received the pending request.

As will be described more below, since the signal quality is good for each of the RABs, the target RNCS 20 may prioritize the terminal handover procedure of these RABs as low priority. This is particularly true when other relocation requests are pending at the target RNCS 20, wherein the link quality of those respective RABs are at least partially degraded. Steps 350-355 may be repeated periodically; e.g., source RNCS 18 may repeat the message as the previous pending HO request message may expire after a predetermined amount of time. In this example, the link quality remains good (01) each time steps 350-355 are repeated.

Steps 360 and 365 which follow may be similar to steps 350 and 355; however, here the link quality of at least one of the RABs has degraded. For illustration purposes, consider that the link quality of all three RABs is now a slightly degraded link quality (02). At the target RNCS 20, the handover of terminal A may now be given higher priority—because, e.g., if its RABs continue to degrade, eventually the RABs may be lost. In some instances, steps 360-365 also could be repeated.

Having granted the handover of terminal A higher priority (e.g., based on the degraded link quality experienced by the RAB(s) of terminal A), the target RNCS 20 may determine it is able to proceed with the terminal handover procedure from the source RNCS 18 as a result of it releasing one or more of its current RABs (e.g., associated with one of terminals B-G) (S370, FIG. 4)—e.g., assuming a suitable amount of throughput is now available based on the released one or more of the target's current RABs. Of course, the example of the RABs having a metric of 02 is merely an example. It should be appreciated that the handover procedure could proceed when the associated metric is 01, 03, etc. as well.

Thus, in response to the target RNCS 20 determining to accept the pending handover request, the target RNCS 20 (via the Iur interface 30) may transmit a pending HO accept message to the source RNCS 18 (S375). And source RNCS 18 may respond by sending a pending HO accept ACK message (S380) (also via the Iur interface 30). As discussed below, while intra-satellite base station communication may occur via the Iur interface 30, the handover procedure—in accordance with protocol—still is carried out via the core network 22 and Iu interface 32; e.g., since mobility management is handled by the core network 22 which desires to know which RNCS is communicating with a particular satellite terminal (e.g., for routing incoming calls or the like to the appropriate RNCS).

Optionally, after receiving the pending HO accept ACK (S380), the source RNCS 18 may transmit a position query to terminal A and receive a position report in response (S385, S390); this may be similar or identical to S315-S320; therefore, this process will not be re-described. Similarly, the source RNCS 18 may re-determine whether terminal A remains within the footprint 26 (S395); and this may be identical to S325; therefore, this process will not be re-described either.

In some instances, the terminal A will no longer be located in the first target footprint 26. For example, terminal A may have returned to the source footprint 24; therefore, no terminal handover procedure may occur, and source RNCS 18 may send a message to the target RNCS 20 indicating a cancelation. Or for example, terminal A may have moved within another beam (e.g., and be within the second target footprint 48 (FIG. 2)). In this instance, the source RNCS 18 may send a cancelation message to the target RNCS 20 and send a relocation request message to a different target RNCS (not shown) via the core network 22 (e.g., similar to that described in S330). Thus, repeating S385, S390, S395 may improve service provided to terminal A—e g, minimizing the likelihood of a terminal handover to a less desirable satellite beam.

As discussed briefly above, in some instances, S385, S390, S395 may be omitted. One non-limiting example includes receiving from the target RNCS 20 a pending HO accept message within a predetermined time threshold of receiving a position report from terminal A (e.g., less than one minute earlier or the like). In this case, re-performing S385-S395 could generate unnecessary network congestion and may best be avoided.

When the source RNCS 18 confirms that the location of terminal A is still within first target footprint 26, then source RNCS 18 may send another relocation request message to the target RNCS 20 via the core network 20 (e.g., via the Iu interface 32) (S400), and the core network 22 may transmit that request message to the target RNCS 20 (S405); these two steps may be identical to S330, S335; therefore, they will not be re-described here.

Next, the target RNCS 20 may transmit a relocation request ACK message (S410) in response to receiving the request (via the Iu interface 32). This ACK message indicates that it is ready and able to receive the three RABs. Thereafter, in response to the relocation request ACK message, the core network 22 may send a relocation command message to the source RNCS 18 (S415) (also via Iu interface 32).

Upon receipt of this command message, the source RNCS 18 conducts the terminal handover procedure with the target RNCS 20 (S420). The terminal handover procedure includes handing over or transferring the three exemplary RABs. In one example, the source RNCS 18 may command terminal A to change channels to a different communication channel (e.g., a different frequency) associated with the target beam. And when terminal A changes channels, terminal A and the target RNCS 20 begin communicating and the handover procedure is complete. This handover procedure is merely one example; other terminal handover techniques are also possible.

Figure 5:
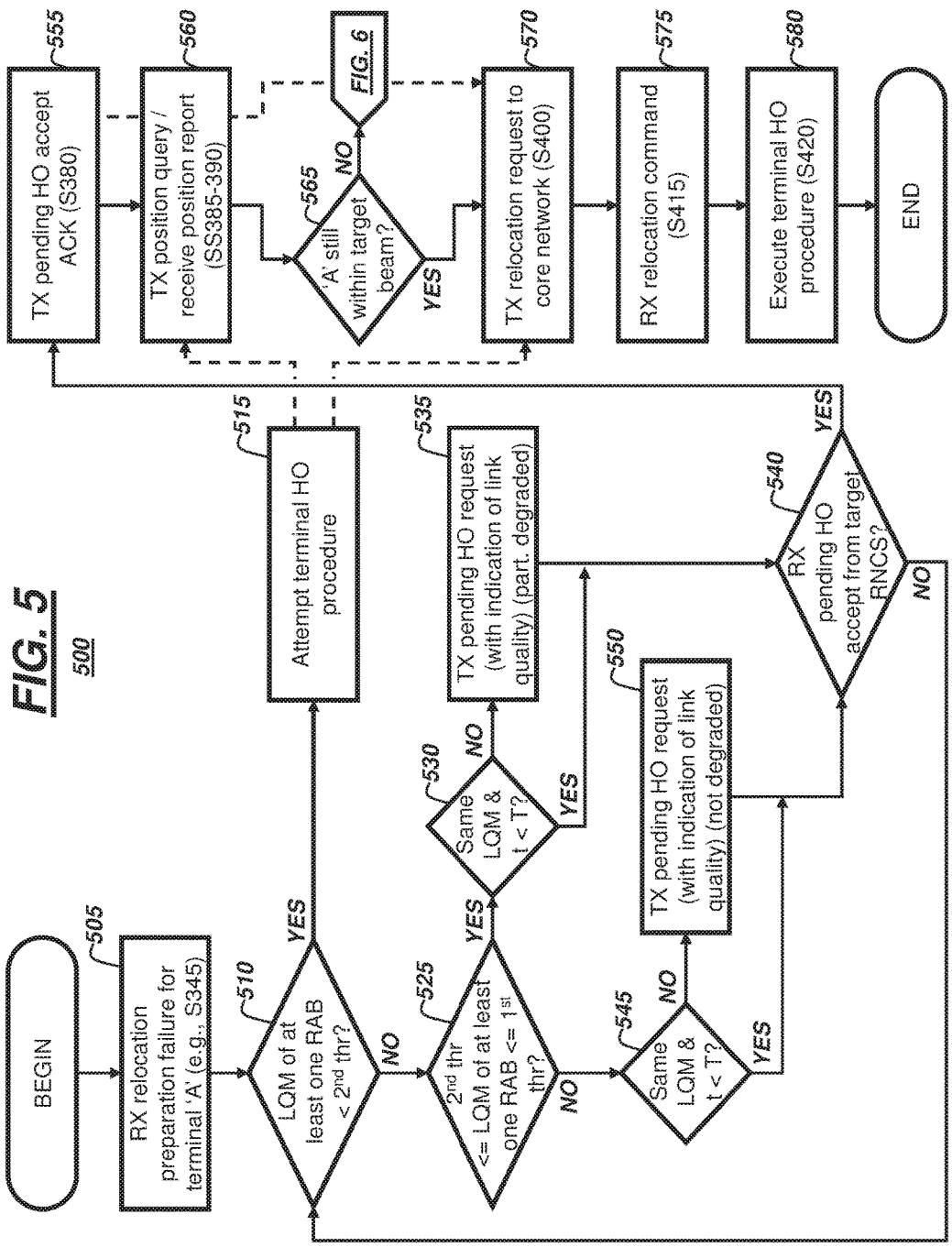
FIGS. 5-6 are flowcharts pertaining to a process of handing over, from a source radio network controller-satellite (RNCS), a terminal having at least one radio access bearer (RAB).

Turning now to FIG. 5, a process 500 of decision blocks is shown illustrating programming instructions which may be carried out by one of the RNCSs when acting as a source RNCS (e.g., such as RNCS 18 did in the flow diagrams described above). The process 500 begins at block 505 wherein the source RNCS 18 receives a relocation preparation failure message associated with terminal A (see S345).

In response to this message, one or more handover variables may be initialized in block 505 as well. For example, source RNCS 18 may initialize a timer value (t) (e.g., to 99 minutes). As discussed briefly above, pending HO request messages may have an expiration; i.e., a target RNCS may ignore such messages older than a predetermined time threshold T (e.g., T=5 minutes). Thus, the time (t) may be initialized to a value longer than the time threshold T (for reasons which will become apparent from the discussion below).

Decision blocks 510 and 525 may utilize link quality thresholds. For example, a first threshold may be '3' and a second threshold may be '0,' as discussed above where the scale metric was 01 when link quality margin (LQM)>3, the scale metric was 02 when 0<=LQM<=3, and the scale metric was 03 when LQM<0. Of course, these values for the first and second thresholds are merely examples as well; other values could be used instead. In block 510 which follows block 505, the source RNCS 18 determines whether the LQM of at least one RAB is less than the second threshold (e.g., whether LQM<second threshold). If the LQM is less than the second threshold, process 500 proceeds to block 515; and if the LQM of the RABs are greater than or equal to the second threshold, process 500 proceeds to block 525.

In block 515, since it is determined that the quality of the RAB is degraded below the second threshold (substantially degraded link quality (03)), the source RNCS 18 may determine to promptly attempt the terminal handover procedure. This may include the source RNCS 18 transmitting a pending handover request with link quality information (e.g., metric 03), a relocation request message (e.g., with similar link quality information), or both. Thus regardless of whether the terminal handover is likely to be successful, the handover procedure may be attempted (e.g., process 500 proceeding initially to block 560 or block 570, which will be explained in greater detail below). This handover attempt may not succeed completely in that some of the terminal's RABs may be dropped; but as any dropped RAB(s) would be those which were experiencing a failing performance (e.g., a failing link) to begin with, proceeding with the handover is still presumed to be the best course of action.

In block 525, source RNCS 18 determines whether the LQM of at least one RAB is between the second and first thresholds (second threshold<=LQM<=first threshold). The process 500 proceeds to block 530 when the LQM of at least one RAB is between the first and second thresholds; and the process proceeds to block 545 when this is not the case (i.e., when LQM>first threshold).

In block 530, source RNCS 18 may determine whether two criteria exist: (1) whether value of the LQM has changed since the last evaluation of block 530, and (2) whether the current time (t) is less than the threshold T (e.g., whether t<T). If the LQM is the same and if t<T, then process 500 proceeds to block 535. And if the LQM is not the same or if t>=T, then process 500 proceeds to block 540. In this case, due to the initialization, t (99 minutes)>T (5 minutes); thus, process 500 proceeds to block 535.

In block 535, the source RNCS 18 transmits a pending handoff HO request message to the target RNCS 20 via the Iur interface 30. As discussed above (S360), the message includes an indication of the link quality for each RAB handled by the terminal—e.g., an indication that the LQM is between the first and second thresholds so that the target RNCS 20 may prioritize this request among other similar requests. In addition, block 535 includes resetting the time (t=0), and source RNCS 18 begins a counter (e.g., t=1, t=2, . . . ).

Block 540 follows block 535. In block 540, the source RNCS 18 determines whether it has received a pending HO accept message from the target RNCS 20. If it has received such a message, then process 500 proceeds to block 555; else, the process 500 loops back to decision block 510. If the LQM has not changed, the process will again proceed from block 510 to block 525 to block 530. In block 530, the time (t) may be less than threshold T and the LQM will be the same as the previous LQM; thus, the process will proceed directly to block 540 (e.g., this time skipping block 535—i.e., not retransmitting another pending HO request message). This loop of blocks may be repeated until the time (t)>=threshold T, when again the source RNCS 18 may transmit another pending HO request message to the target RNCS 20 (e.g., so the target RNCS continues to consider the pending handover from source RNCS 18).

When in block 525 the LQM>the first threshold, the process 500 proceeds to block 545. Block 545 may be identical to block 530—except when the LQM is the same as the previous LQM and the t<T, then the process proceeds to block 550, else the process proceeds to block 540. Thus, when time (t) has not been reset (e.g., t=99 minutes)—e.g., the process may proceed from blocks 505 to 510 to 525 to 545—then the process 500 proceeds to block 550. In block 550, the source RNCS 18 transmits a pending HO request message to the target RNCS 20 and this includes an indication of a good link quality of the RABs. Similarly, in block 550, the time (t) can be reset to zero (and a counter begun). On subsequent loops from blocks 540 to 510 to 525 to 545, the process may proceed directly from block 545 to block 540 when LQM is unchanged (still good link quality) and time t<threshold T.

During the previously described decision block loops, a position report from terminal A may cause the source RNCS 18 to cancel the pending HO request. Further, in some instances, the target RNCS 20 could transmit a pending HO accept message to the source RNCS 18. And when this occurs, the process 500 will proceed from block 540 to block 555. In block 555, the source RNCS transmits a pending HO accept ACK message (see S380).

Following block 555, the process may proceed to block 560 or skip to block 570—e.g., as described below, the source RNCS 18 optionally may re-determine the position of terminal A. In at least one embodiment, the source RNCS 18 transmits a position query to terminal A and receives a position report in response (block 560, see S385, S390).

Figure 6:
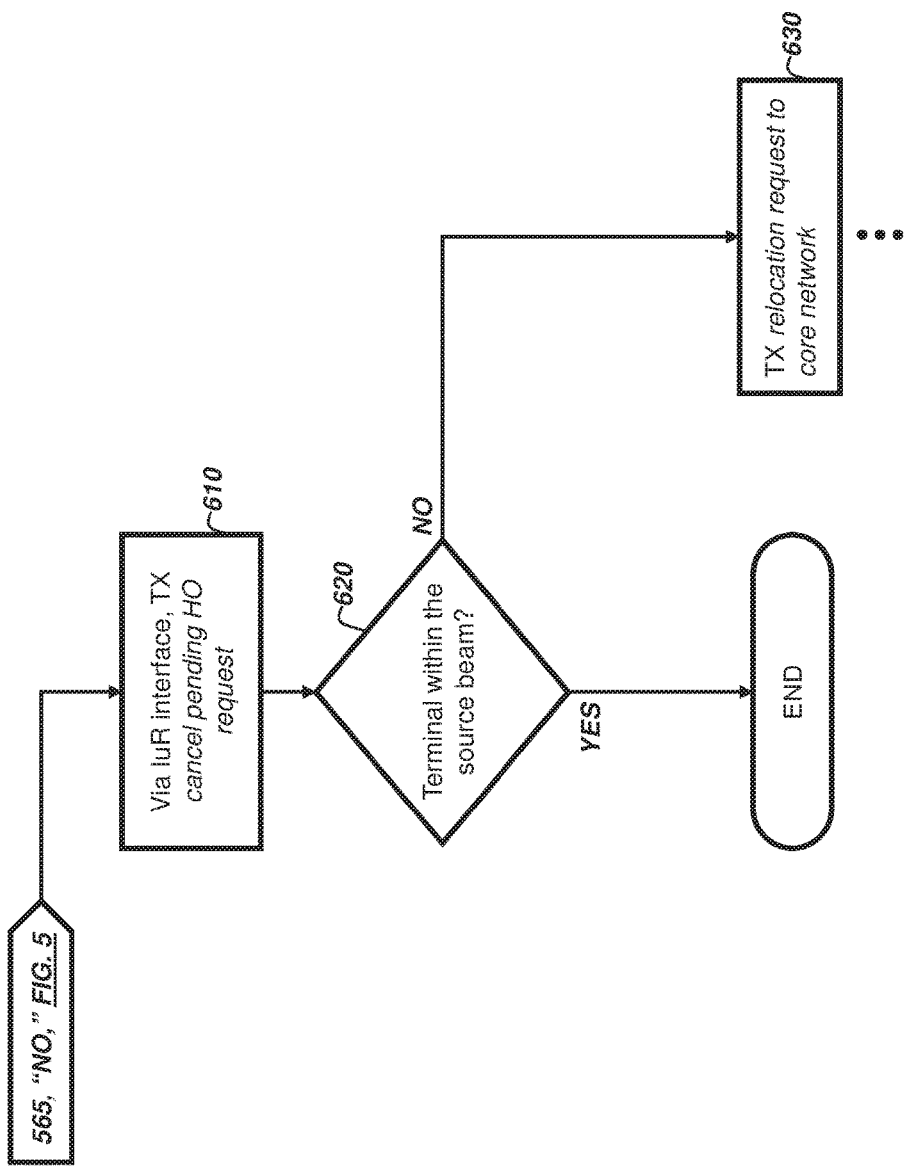

In block 565 which follows, source RNCS 18 re-determines whether terminal A is within the first target footprint 26 (see S395). If it is within footprint 26, then process 500 proceeds to block 570; if it is not, it proceeds to block 610 (FIG. 6).

In block 610, the source RNCS 18 transmits a cancel pending HO request message to the target RNCS 20 via the Iur interface 30. In block 620 which follows, the source RNCS 18 determines whether terminal A is within the source footprint 24 again. If it is, the process ends.

If terminal A is not within the source footprint 24 (and is not within the first target footprint 26), then the source RNCS 18 determines that the terminal may be in another footprint—e.g., the second target footprint 48 (see also FIG. 2). Thus, process 500 proceeds to block 630 and the source RNCS 18 may transmit a relocation request message to the core network 22 and begin the process shown in the flow diagrams (FIGS. 3-4) again. Ultimately, if in response to the relocation request message, the source RNCS 18 receives a relocation preparation failure message, process 500 may begin again at block 505.

Returning now to FIG. 5 block 570 (e.g., when terminal A still is located within the first target footprint 26), here the source RNCS 18 transmits a relocation request message again to the core network 22 (e.g., see S400).

In block 575 which follows, the source RNCS 18 receives a relocation command message from the core network (see S415). And in block 580 which follows, the terminal handover procedure is executed (see S420). Thereafter, process 500 ends.

Process 500 detailed programming instructions executed by the RNCS computer 18 acting as a source device. As discussed above, RNCS 18 also could act as a target device when another RNCS requests of it relocation of a terminal. Accordingly, a process 700 described below details programming instructions executed by the RNCS computer 20 acting as a target device. And similarly, RNCS 20 could also act as a source device in other circumstances.

Figure 7:
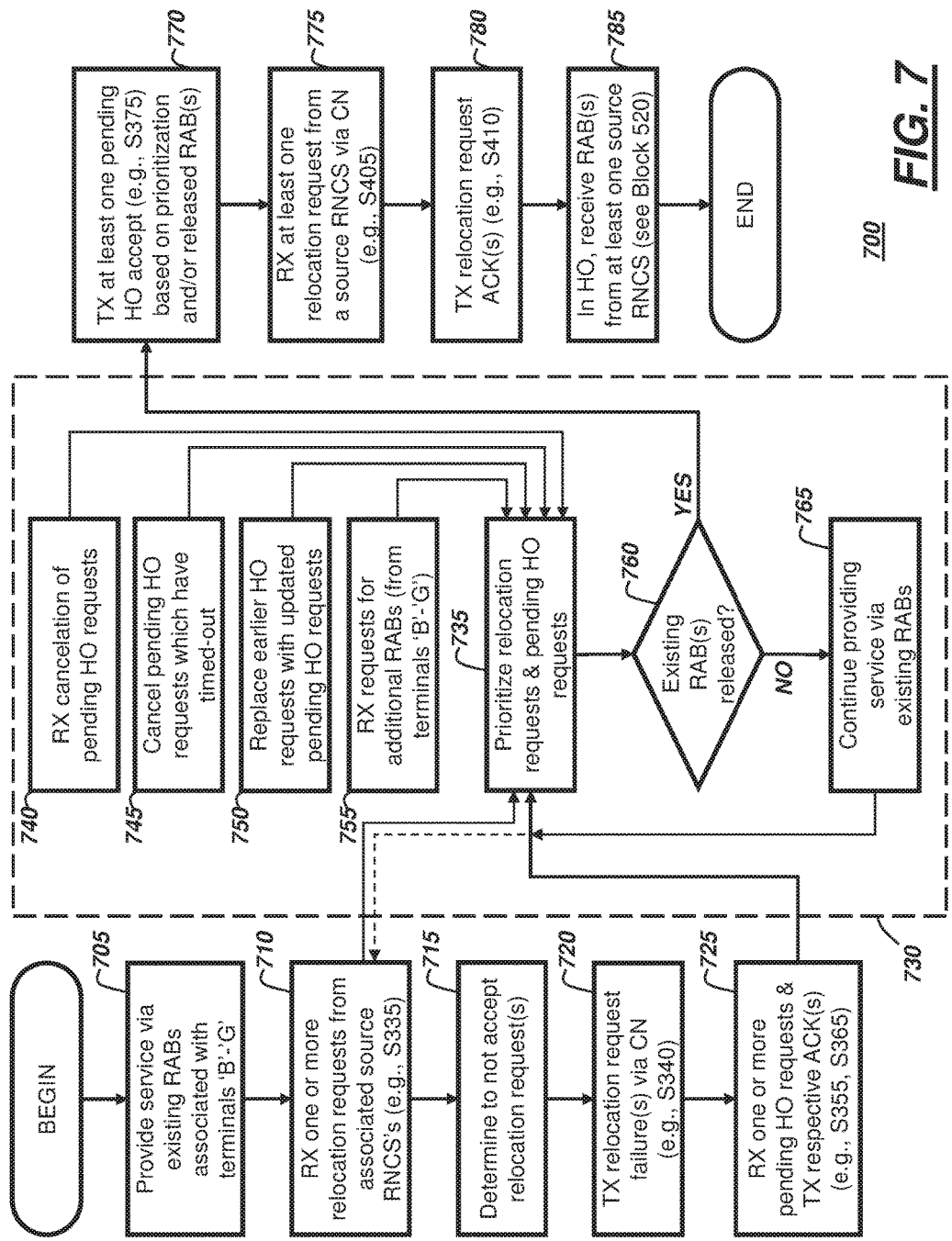
FIG. 7 is a flowchart pertaining to a process of receiving, at a target radio network controller-satellite (RNCS), at least one RAB during a terminal handover procedure.

FIG. 7 illustrates an example process 700 and begins with decision block 705. In block 705, target RNCS 20 provides service via a satellite link and any existing RABs associated with terminals B-G (S310). Of course, the number of terminals and the quantity of RABs associated with each terminal is merely exemplary; other examples also exist with more or fewer terminals and more or fewer RABs.

In decision block 710 which follows, the target RNCS 20 (for one of a plurality of target beams) receives one or more relocation request messages from other RNCSs (e.g., source RNCSs like RNCS 18) (see S335). In at least one example, the relocation request messages include link quality data of the associated RABs. The number of relocation request messages may vary.

In one implementation, process 700 may proceed directly to block 735 wherein the target RNCS 20 prioritizes relocation requests and pending HO requests; this will be discussed in greater detail below. In at least one example, the process proceeds to blocks 735 and 715 at least partially concurrently. In block 715, target RNCS 20 determines to not accept at least some of the relocation requests—e.g., this may be based on available bandwidth and a relatively high throughput. Consequently, in decision block 720 which follows, target RNCS 20 transmits a respective number of relocation request failure messages to the source RNCSs (see S340).

In response to sending the relocation request failure messages, target RNCS 20 (in block 725) may receive one or more pending handover request messages and then transmit respective pending handover ACK messages (S355, S365). As described above, it should be appreciated that the pending handover request messages may include link quality information pertaining to their respective RABs.

Following block 725, the process proceeds to block 730 (e.g., more specifically, to block 735). In block 730, the target RNCS 20 may perform a number of instructions concurrently—e.g., including monitoring pending HO requests and relocation requests, prioritizing such requests, providing service to any current terminals (e.g., B-G), and determining whether any RABs associated with those current terminals are being released. Thus, block 730 may include blocks 735-765. Further, as illustrated, blocks 710, 725, 740-755, and 765 may provide input to block 735.

Blocks 710 and 725 were previously discussed. In block 740, target RNCS 20 may receive cancel pending HO request messages (via Iur interface 30) pertaining to previously-received pending HO request messages (see block 610).

In block 745, the target RNCS 20 may cancel pending HO requests which have timed out. For example, when a pending HO request message is received from a source RNCS, the target RNCS 20 may begin a counter as well, and if the pending HO request message is not acted upon within a predetermined period of time (t), then pending HO request message may be removed from a target RNCS queue. Continuing with the non-limiting example described above, if time (t) is greater than or equal to 5 minutes, then the pending HO request message may be canceled or ignored by the target RNCS 20.

In block 750, the target RNCS 20 may replace previously-received pending HO requests with new or updated pending HO requests (e.g., see blocks 535, 550). New pending HO request messages may include updated information pertaining to the link quality of one or of the RABs associated therewith. Thus, updated pending HO request messages may be pertinent to prioritization in block 735.

In decision block 755, the target RNCS 20 may receive requests for additional RABs from its currently connected terminals B-G. In some instances, currently-connected terminals may be granted higher priority in block 735; however, this is not required.

Thus in block 735, target RNCS 20 may prioritize requests from a variety of different sources, including e.g.: relocation request messages (block 710), pending HO request messages (block 725), and request messages from currently-connected terminals B-G. In at least one example, requests indicating a substantially degraded link quality (03) (for at least one RAB) are granted the highest priority. Then, requests indicating a slightly degraded link quality (02) are granted the next highest priority (again, for at least one RAB). And then, requests indicating a good link quality (01) are granted the next highest priority.

In other examples, when an excessive quantity of requests are present and when the respective satellite beam traffic capacity cannot handle of the pending terminal handover requests (e.g., without dropping RABs from one or more terminals), then requests indicating a slightly degraded link quality may be granted the highest priority—e.g., a presumption being the target RNCS 20 cannot handle all those requests having a scale of 02 and 03, that those having a scale of 03 are more likely to be lost, that those having a scale of 01 are currently experiencing good quality and may be handed-over at a later time if still necessary, and by placing the highest priority on those having a scale of 02, the highest quantity of customers may be satisfied. Of course, these are merely examples of priority schemes; other implementations also exist.

Following at least some prioritization in block 735, the process may continue at block 760. In decision block 760, the target RNCS 20 may determine whether any existing RABs of terminals B-G have been released. If these RABs have been released, process 700 proceeds to block 770. If these RABs have not been released, block 765 follows.

In block 765, target RNCS 20 continues providing service to terminals B-G, and then process 700 loops back and repeats block 735. Of course, in looping back, additional relocation request messages (block 710) and additional pending HO request messages (block 725) also could be received.

Once current RABs in the target beam handled by target RNCS 20 are released, the process may proceed to block 770, and based on the prioritization determined in block 735, the target RNCS 20 may transmit at least one pending HO acceptance message to a respective source RNCS (S375).

In response to executing block 770, the target RNCS 20 may receive at least one relocation request message from the respective source RNCS via the core network (S405). And in block 780 which follows, target RNCS 20 may transmit an acknowledgment (S410). Thereafter in block 785, the terminal handover procedure (see block 580) may occur with the terminal handed over from the source beam (handled by source RNCS 18) to the target beam (handled by target RNCS 20); this results in at least on RAB being transferred to the target beam. Thereafter, the process 700 ends.

Thus, processes 500 and 700 are adapted to maintain the terminal's satellite connection with the source beam for a longer period of time in order to minimize dropped RABs. As described, the target RNCS may accept terminal handovers based on priority—extending the duration of pending handovers when the signal quality with the source RNCS is acceptable, and shortening the duration of some pending handovers when the respective link quality of the RABs to be handed-over is slightly or substantially degraded. Ultimately, the RNCSs—operating in respective 'source' and 'target' roles—can work cooperatively to delay terminal beam-to-beam handovers. More particularly, when acting as a target RNCS, the RNCS can selectively delay some terminal handovers enabling it to prioritize which terminal handovers occur first—e.g., thereby minimizing the number of dropped RABs and thereby improving the user experience.

Other examples also exist. For example, in process 700, the target RNCS 20 may receive some request messages (similar to those described in S330, S350, S360) with an indication of signal quality and some request messages without such an indication. Those with indications of signal quality may be given higher priority than those without. Similarly, a single request message may have multiple RABs; however, signal quality may not be provided for at least one of those RABs. In this instance, the RAB without an accompanying indication of signal quality may be considered the lowest priority.

Thus, there has been described a satellite communication system having computers (e.g., radio network controllers for satellites) programmed to delay execution of a terminal handover procedure. As part of the handover procedure, the computers may be programmed to determine a link quality of a radio access bearer (RAB) connection. Further, the computers may be programmed to prioritize a handover procedure based on the determined link quality.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A first computer, comprising a processor and memory storing instructions executable by the processor, the processor programmed to:
    establish a satellite link between a satellite terminal and the first computer, the link comprising at least one radio access bearer (RAB);
    receive a rejection message from a second computer indicating that the second computer refuses to accept a terminal handover; and
    in response to receiving the rejection message, transmit to the second computer a pending handover request message comprising an indication of a link quality of the at least one RAB,
    wherein the first computer is a source radio network controller for satellite (RNCS), wherein the second computer is a target radio network controller for satellite (RNCS).

2. The first computer of claim 1, wherein the processor further is programmed to, prior to receiving the rejection message, transmit a relocation request message that includes the indication of the link quality of the at least one RAB.

3. The first computer of claim 1, wherein the processor further is programmed to: determine that the link quality of the at least one RAB has degraded; and based on the determination, transmit to the second computer another pending handover request message with an updated indication of the link quality.

4. The first computer of claim 1, wherein the processor further is programmed to, receive from the second computer an acceptance of the pending handover request message via a radio network controller interface.

5. The first computer of claim 4, wherein the processor further is programmed to, in response to receiving the acceptance of the pending handover request message, transmit a relocation request message to the second computer via a Serving GPRS Support Node (SGSN).

6. The first computer of claim 1, wherein the rejection message is received at the first computer via a core network interface, wherein the pending handover request message is transmitted via a radio network controller interface.

7. The first computer of claim 1, wherein the processor further is programmed to determine a link quality margin (LQM), wherein the pending handover request message includes either the LQM or a scaled metric associated with the LQM.

8. The first computer of claim 7, wherein the LQM is defined by EsNo(current)−EsNo(CurrentStdDev)−EsNo(min), wherein EsNo(current) refers to an energy-to-noise ratio at the time of measurement, wherein No(CurrentStdDev) refers to the standard deviation of EsNo(current), and wherein EsNo(min) refers to a minimum signal energy of a satellite beam associated with a frame error rate (FER).

9. A system, comprising:
  a first computer, comprising a processor and memory storing instructions executable by the processor, the processor programmed to:
    receive via an Iur interface, from at least one second computer, one or more satellite terminal handover request messages, wherein each of the one or more messages includes an indication of link quality of at least one radio access bearer (RAB) connection;
    select one of the one or more messages based on the indication of the link quality of the at least one RAB connection; and
    based on the selection, transmit an acceptance message to the at least one second computer.

10. The system of claim 9, wherein the first computer is a target radio network controller for satellite, wherein the one or more second computers are source radio network controllers for satellite.

11. The system of claim 9, wherein the processor further is programmed to determine which of the one or more messages to select based on a comparison of a bandwidth of a satellite beam associated with the first computer and a current throughput associated with currently-connected RAB connections of the satellite beam.

12. The system of claim 9, wherein the processor further is programmed to determine which of the one or more satellite terminal handover request messages to select based on a release of at least one currently-connected RAB.

13. The system of claim 9, wherein the processor further is programmed to, prior to transmitting the acceptance message: receive a relocation request message associated with a RAB connection from among the one or more messages, transmit a rejection message associated with the RAB connection from among the one or more messages, and receive a pending handover request message associated with the RAB connection from among the one or more messages.

14. The system of claim 13, wherein the relocation request message includes the indication of the link quality associated with the respective at least one RAB connection.

15. The system of claim 13, wherein the relocation request message is received via a Serving GPRS Support Node (SGSN).

16. The system of claim 13, wherein the pending handover request message includes the indication of the link quality associated with the a RAB connection from among the one or more messages.

17. The system of claim 13, wherein the pending handover request message is received via a radio network controller interface.

18. The system of claim 9, wherein the processor further is programmed to: determine how long the one or more messages have been in a queue; and cancel or ignore any of the one or more messages older than a threshold.

19. A satellite base station, comprising:
  a first computer communicating with a satellite terminal via a satellite link and having at least one radio access bearer (RAB); and
  a second computer coupled to the first computer via a radio network controller interface,
  wherein the first computer is programmed to transmit a message to the second computer, via the radio network controller interface, regarding a handover of the satellite terminal, wherein the message includes an indication of a link quality associated with the at least one RAB,
  wherein the second computer is programmed to, upon receiving the message:
    queue the message;
    compare the indication of the link quality of the at least one RAB with other link quality indications of other RABs associated with other queued messages also received by the second computer;
    release at least one RAB currently serviced by the second computer; and
    accept a handover of the satellite terminal based on the indication of the link quality.

* * * * *